United States Patent
Bernsee

[11] 3,966,300
[45] June 29, 1976

[54] LIGHT CONDUCTING FIBERS OF QUARTZ GLASS

[75] Inventor: Gerhard Bernsee, Mainz-Weisenau, Germany

[73] Assignee: Jenaer Glaswerk Schott & Gen., Mainz, Germany

[22] Filed: Jan. 22, 1973

[21] Appl. No.: 325,377

[30] Foreign Application Priority Data
Jan. 24, 1972  Germany............................ 2203140

[52] U.S. Cl. ............................. 350/96 B; 350/96 R; 350/96 WG; 350/96 M
[51] Int. Cl.² ............................................ G02B 5/16
[58] Field of Search ....................................... 350/96

[56] References Cited
UNITED STATES PATENTS

| | | |
|---|---|---|
| 3,275,408 | 9/1966 | Winterburn ............... 350/96 WG X |
| 3,320,114 | 5/1967 | Schulz .......................... 350/96 R X |
| 3,480,458 | 11/1969 | Dislich et al. ................. 350/96 B X |
| 3,659,915 | 5/1972 | Maurer et al. ................ 350/96 WG |
| 3,711,262 | 1/1973 | Keck et al. ................. 350/96 WG X |
| 3,737,292 | 6/1973 | Keck et al. ................. 350/96 WG X |
| 3,806,224 | 4/1974 | MacChesney et al. ......... 350/96 WG |

FOREIGN PATENTS OR APPLICATIONS 1,155,795   6/1969   United Kingdom ........... 350/96 WG

*Primary Examiner*—David H. Rubin
*Attorney, Agent, or Firm*—Millen, Raptes & White

[57] ABSTRACT

Light-conducting optical fibers in which both the core and sheath consist essentially of quartz glass are provided by encasing a relatively anhydrous quartz glass core with a quartz glass sheath having a sufficiently high water content to lower the refractive index thereof. The fibers are ideally suited for the transmission of ultraviolet light with maximum efficiency.

15 Claims, 3 Drawing Figures

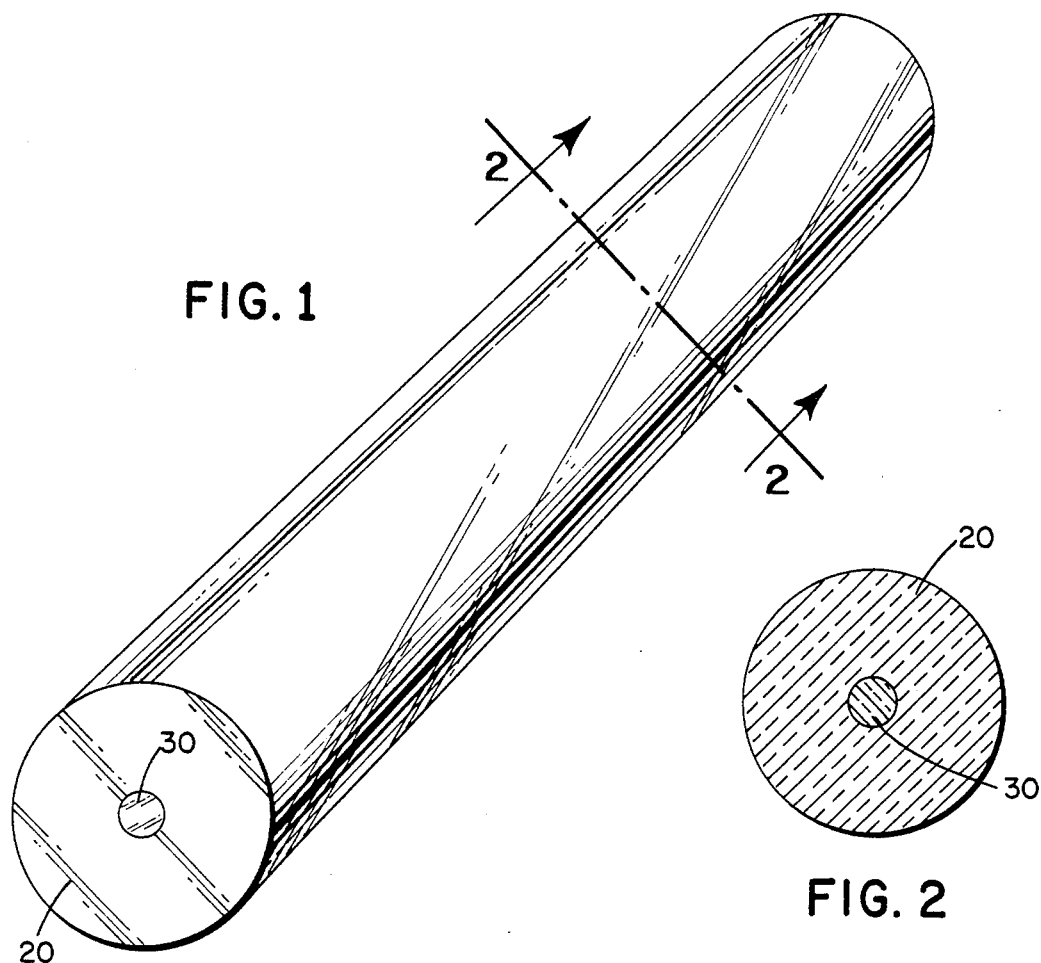
FIG. 1
FIG. 2
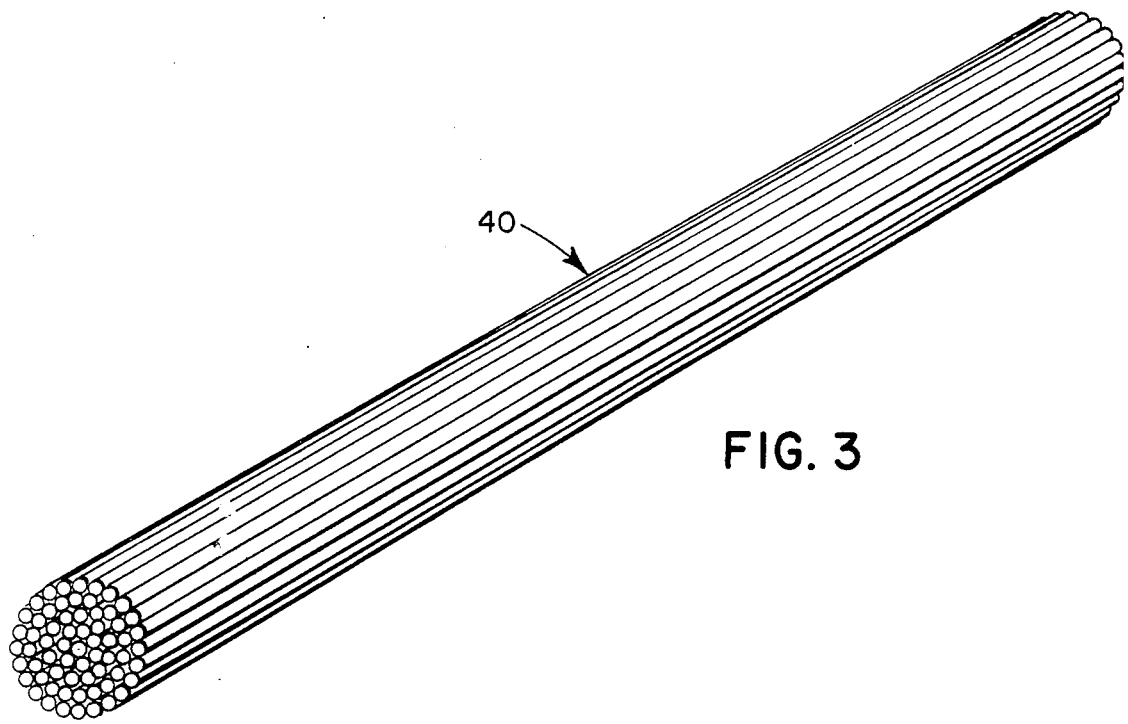
FIG. 3

LIGHT CONDUCTING FIBERS OF QUARTZ GLASS

BACKGROUND OF THE INVENTION

This invention relates to optical fibers. More particularly, this invention relates to optical fibers in which both the core and sheath consist essentially of quartz glass.

Light conducting optical fibers are based on the principle that their internal reflectance approaches total internal reflectance when a core fiber has a transparent coating having a refractive index lower than that of the core and when the incident ray is within a particular acceptance angle $\theta$, the maximum angle from the longitudinal axis at which an incident ray can be transmitted through the core fiber. The sine of this angle is defined as the numerical aperture (NA) given by the equation $$\text{sine } \theta = NA = \sqrt{N_1^2 - N_2^2}$$

wherein $N_1$ and $N_2$ represent the core refractive index and the coating refractive index respectively.

Numerous methods are known in the art for producing optical fibers by enclosing a core of high refractive index within a sheath of lower refractive index. Core/sheath combinations which have been employed include synthetic plastic/synthetic plastic; multicomponent glass/multicomponent glass; multicomponent glass/synthetic plastic; quartz glass/synthetic plastic, etc. Additionally, optical fibers can be prepared by lowering the refractive index of the fiber sheath by ion-exchange and/or by giving the ion-exchanged fibers a refractive index profile, e.g., with a quadratic path.

Fiber optics composed of many optical fibers bundled together can take many forms, e.g., tortuous paths, faceplates, tapered fibers for magnification, etc. The bundles can be oriented to a coherent bundle capable of transmitting optical images or they can be unoriented light pipes capable of transmitting light, but not optical images. Quartz fibers have recently become available for transmission of ultraviolet light and are superior in many respects to glass or plastic fibers, but have heretofore required a glass or plastic sheath. The use of glass sheaths over a quartz glass core is disadvantageous, inter alia, in the different physical properties of the two materials, e.g., thermal expansion coefficients, which limit the areas of practical application. Plastic sheaths are susceptible to aging and oxidation, especially when exposed to ultraviolet light, and generally have poorer physical properties than quartz glass.

As is known, fiber dimensions are not critical provided their diameters are large in comparison to the wavelength of light to be transmitted and provided that the fibers in a bundle are spaced at least a wavelength apart to prevent light leakage from one to another.

Quartz glass can be produced with extremely low optical losses (5 – 10 dB/km at 850nm), while the lowest loss so far achieved with multi-component glass is about 50 dB/km at 850nm. The low losses of the quartz glass enable light transmission over large distances through a quartz glass optical fiber. Furthermore, data can be impressed on the transmitted light whereby the quartz glass optical fiber serves as a data transmission medium.

The production of a quartz glass optical fiber having a quartz glass sheath has not heretofore been possible because quartz glass has the lowest refractive index of all known glasses. Consequently, there is no available glass having a refractive index with which a quartz glass core could be covered to optically isolate the fiber. The possibility exists of enclosing the quartz glass fiber with a synthetic plastic sheath having a lower refractive index, e.g., Teflon. However, such fibers have transmission losses which lie in the same order of magnitude as the multi-component glass fibers. Thus, while they have the advantage of being transmissive for ultraviolet, fibers sheathed with synthetic plastics are unsuitable for transmitting light over large distances.

Attempts to increase the refractive index of quartz glass by doping it, inter alia, with $TiO_2$, as described in German Offenlegungsschrift 2,122,896 have also been made. While an increase in the refractive index can be achieved by such doping, the transmission of the quartz glass is simultaneously deleteriously affected and this naturally is undesirable. A further particular disadvantage of the doping is that the ultraviolet transmission decreases; good ultraviolet transmission is typically the reason for which quartz glass is selected in the first place.

OBJECTS OF THE INVENTION

Accordingly, it is a general object of this invention to provide improved optical fibers.

Another object of this invention is to provide quartz glass optical fibers having improved physical properties.

An additional object of this invention is to provide quartz glass optical fibers in which both the core and sheath consist essentially of quartz glass.

A further object of this invention is to provide improved fiber optics based on the optical fibers of this invention.

Other objects and advantages of this invention will become apparent to those skilled in the art upon further study of the specification and appended claims.

SUMMARY OF THE INVENTION

Briefly, the above and other objects are attained in one aspect of the present invention by providing a light-conducting optical fiber having an acceptance angle $\theta$ of at least about 0.6° and comprising a quartz glass core having a refractive index $N_1$ encased by a quartz glass sheath having a refractive index $N_2$ and a water content sufficiently higher than the water content of said core so that $N_1$ is greater than $N_2$ and wherein sine $\theta = \sqrt{N_1^2 - N_2^2}$.

DESCRIPTION OF DRAWING

FIG. 1 is a perspective view of an optical fiber wherein core 30 is surrounded by sheath 20.

FIG. 2 is a cross sectional view of the optical fiber of FIG. 1 taken 2 — 2.

FIG. 3 is a fiber optic tube bundle generally indicated as 40 and comprised of a bundle of optical fibers as shown in FIGS. 1 and 2.

DETAILED DISCUSSION

It has now surprisingly been found that it is possible to obtain a light-conducting fiber which consists essentially of quartz glass. The light-conducting fiber according to this invention has the advantage that the core is of the highest possible transmissivity. These new light-conducting fibers are also more easy to process than, for example, a fiber consisting of quartz glass/synthetic plastic. They have the additional advantage that they transmit ultraviolet. In this manner, optical fibers can be prepared having extremely low light transmission losses, e.g., of only 20 dB/km at 850nm.

It is known that increasing the water content of quartz glass slightly lowers its refractive index. Thus, for example, Suprasil W (transparent, synthetic quartz glass which is practically OH-free) has a refractive index $n_c = 1.45647$ at 656.27mμ, while Suprasil at the same wavelength has a refractive index $n_c = 1.45637$ (Suprasil W and Suprasil are trade names of Heraeus-Schott-Quarz Schmelze GmbH; Hanau, Germany-West.

Using the above refractive index data, the numerical aperture NA for optical fibers prepared with a Suprasil W core clad with a Suprasil sheath is 0.017067, which corresponds to an acceptance angle $\theta$ of 1.96°. In contrast to typical glass optical fibers which generally have a numerical aperture of about 0.63 and an acceptance angle of about 39°, the optical fibers of the present invention provide highly specific fiber optics which are especially useful in coherent bundles due to the narrow acceptance angle of the fibers.

The water is incorporated into the quartz glass in the form of OH-groups. The water content of the glass can be determined on the basis of the IR absorption bands, the intensity of which can be converted into percent by weight using extinction coefficients.

It has now been found that to obtain a quartz glass optical fiber capable of optical filter use, the difference between the water content in the core glass and the sheathing glass should amount to at least 100 ppm, preferably at least 800 ppm. The water content of the core is preferably about 0 ppm to 20 ppm, and desirably as far as possible absolutely anhydrous, e.g. about 0.5 to 5 ppm.

Thus, for a perfectly anhydrous glass, the water content of the sheathing glass is at least 100 ppm, preferably at least 800 ppm. The preferred maximum quantity of water in the sheathing glass is 4000, more preferably 2500 ppm.

Quartz glass suitable for use as the core material of the present invention has a refractive index of 1,45857 to 1,45856, preferably 1,45857 to 1,458565. The quartz glass suitable for use as the sheath material of the present invention is chosen to meet the above criteria and will generally have a refractive index of 1,458555 to 1,45817, preferably 1,45849 to 1,45823. For most applications, the numerical aperture will be at least 0.6°, preferably at least 1,75°.

Quartz glasses having the above characteristics suitable for use in the present invention are known in the optics art as optical quality silica glass consisting essentially of silicon dioxide in a vitreous modification having a very low coefficient of expansion and which is isotropic; it is generally produced in a known manner by rapid chilling of mother β-cristobolite. The water content of quartz glass can be varied by modifying conventional methods of making silica glass by additionally using a plasma torch, and, if desired, heating the silica glass in an aqueous atmosphere.

The composition of Suprasil and Suprasil W used in the following Example is as follows:

| Suprasil I | Suprasil W |
|---|---|
| 99,9 % $SiO_2$ | 99,999 % $SiO_2$ |
| 0,1 % $OH^1$ | 0,001 % $OH^1$ |
| up to 1 ppm | up to 1 ppm trace elements |

For the production of the novel light-conducting fiber, there is first produced a quartz glass capillary, consisting of a water-containing quartz glass. A quartz glass rod is laid in this capillary and the whole is drawn out into a molten quartz glass capillary/quartz glass rod system. Depending on the desired dimensions of the parts of the system, it is possible from this capillary/rod system to produce fibers which have either thick cores or thin cores according to these procedures, which are known from the production of glass fibers. For producing thin-core fibers, the capillary/rod system is again inserted into a capillary of water-containing quartz glass and then drawn out into a molten capillary/capillary/rod system. Thereafter, this system can be drawn out into a fiber. Thin-core fibers are for example produced in order to transmit discrete images with a single light-conducting fiber.

The quartz light-conducting fiber can also be produced by putting together a plurality of water-containing quartz glass rods, placing an anhydrous quartz glass rod therebetween and then fusing the whole into a system which is thereafter drawn or pulled out into a fiber.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

EXAMPLE

For producing a thin-core quartz glass optical fiber, a quartz glass capillary is produced from water-containing quartz glass (Suprasil I), with the dimensions of external diameter = 45mm and internal diameter = 7mm. An anhydrous quartz glass rod (Suprasil W) with a diameter of 6.5mm was introduced into this capillary.

To avoid dispersion centers and inclusions, the surfaces to be fused must be extremely well cleaned, as is known in the art, e.g., with pure degreasing agents such as methanol, ethanol, isopropanol, trichlorethylene, perchlorethylene, xylene, etc., and thereafter rubbed dry or even rubbed dry with spectrophotometric grade acetone.

The capillary/rod system was then drawn or pulled out into a molten capillary/rod system with a diameter of 6.5mm. After again cleaning as indicated above, this system was once again introduced into a capillary of water-containing quartz glass, and drawn out into a capillary/capillary/rod system, which showed a ratio between core diameter and system diameter of about 1:50. This system was then drawn out in another step into fibers having core diameters from 2 to 50mm (microns).

In the foregoing example, the core glass had a water content of about 4ppm and a refractive index of 1.45857, while the sheathing glass had a water content of about 1000ppm and a refractive index of 1.45847.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A light-conducting optical fiber comprising a quartz glass core consisting of $SiO_2$, 0–20 ppm $H_2O$, and up to 1 ppm trace elements, and having a refractive index $N_1$, encased by a quartz glass sheath consisting of $SiO_2$, 800–4000 ppm $H_2O$, and up to 1 ppm trace elements, and having a refractive index $N_2$, $N_1$ being greater than $N_2$.

2. An optical fiber according to claim 1 wherein the difference in refractive index between the quartz glass core and the quartz glass sheath is at least 0.0001.

3. An optical fiber according to claim 1 wherein the quartz glass core is anhydrous quartz glass having a water content of less than about 5 ppm.

4. An optical fiber according to claim 1 wherein the difference in water content between the quartz glass core and the quartz glass sheath is about 1,000 ppm.

5. An optical fiber according to claim 1 wherein the refractive index of the quartz glass core is about $N_H$ 1.45647.

6. An optical fiber according to claim 5 wherein the refractive index of the quartz glass sheath is about $N_H$ 1.45637.

7. An optical fiber according to claim 5 having an acceptance angle $\theta$ of about 1.96° wherein sine $\theta = \sqrt{N_1^2 - N_2^2}$.

8. In a fiber optic bundle, the improvement which comprises using an optical fiber according to claim 1.

9. A coherent fiber optic bundle according to claim 8.

10. An optical fiber according to claim 1 wherein the water content of the sheath glass is not more than 2500 ppm.

11. An optical fiber according to claim 10 wherein the water content of the core glass is about 0.5 to 5 ppm.

12. An optical fiber according to claim 1 wherein the refractive index of the core glass is 1.45857 to 1.45856 and that of the sheath glass is 1.458555 to 1.45817.

13. An optical fiber according to claim 1 wherein the refractive index of the core glass is 1.45857 to 1.458565.

14. An optical fiber according to claim 1 wherein the refractive index of the sheath glass is 1.45849 to 1.45823.

15. An optical fiber according to claim 1, having an acceptance angel $\theta$ of at least about 0.6° wherein sine $\theta = \sqrt{N_1^2 - N_2^2}$.

* * * * *